United States Patent
Harada

(10) Patent No.: US 12,042,873 B2
(45) Date of Patent: Jul. 23, 2024

(54) THREAD FORMING TAP

(71) Applicant: OSG CORPORATION, Toyokawa (JP)

(72) Inventor: Kazumitsu Harada, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 211 days.

(21) Appl. No.: 17/793,537

(22) PCT Filed: Jan. 21, 2020

(86) PCT No.: PCT/JP2020/002000
§ 371 (c)(1),
(2) Date: Jul. 18, 2022

(87) PCT Pub. No.: WO2021/149167
PCT Pub. Date: Jul. 29, 2021

(65) Prior Publication Data
US 2023/0049644 A1 Feb. 16, 2023

(51) Int. Cl.
*B23G 7/02* (2006.01)

(52) U.S. Cl.
CPC ..................... *B23G 7/02* (2013.01)

(58) Field of Classification Search
CPC ... B23G 5/06; B23G 7/00; B23G 7/02; B23G 2200/34; B23G 2210/04; B23G 2210/44
See application file for complete search history.

(56) References Cited

U.S. PATENT DOCUMENTS

| 3,377,906 A * | 4/1968 | Phipard, Jr. ............ B21H 3/027 470/204 |
| 8,998,734 B2 * | 4/2015 | Norimatsu ............... B23G 7/02 470/204 |
| 9,956,628 B2 * | 5/2018 | Onley ...................... B23G 1/16 |

(Continued)

FOREIGN PATENT DOCUMENTS

| DE | 2302920 A1 * | 8/1973 | ............... B23G 7/02 |
| EP | 0004089 A1 | 9/1979 | |
| JP | H01-289615 A | 11/1989 | |

(Continued)

OTHER PUBLICATIONS

WO 2012161506A2, Kim Nov. 2012.*

(Continued)

*Primary Examiner* — Edward T Tolan
(74) *Attorney, Agent, or Firm* — Oliff PLC

(57) ABSTRACT

A thread forming tap including a complete thread portion and a leading portion is to be screwed into a prepared hole provided in a workpiece so as to cause an inner circumferential surface of the prepared hole to be plastically deformed for thereby forming an internal thread corresponding to the external thread provided in the complete thread portion. A screw thread of the external thread has a leading flank and a trailing flank, which are to be positioned on a front side of the trailing flank and on a rear side of the leading flank, respectively, when the thread forming tap is screwed into the prepared hole. The screw thread is shaped such that, in the leading portion, an indentation depth into the workpiece made by the leading flank is smaller than an indentation depth into the workpiece made by the trailing flank.

2 Claims, 10 Drawing Sheets

(56) References Cited

U.S. PATENT DOCUMENTS

2011/0085867 A1* 4/2011 Ellis .................. B23G 7/02
408/222

FOREIGN PATENT DOCUMENTS

JP       H02-074127 U     6/1990
JP       2004-314231 A   11/2004

OTHER PUBLICATIONS

CN 104668672A, Du et al. Jun. 2015.*
Translation DE 2302920A1, Watson Aug. 1973.*
Apr. 7, 2020 International Search Report issued in International Patent Application No. PCT/JP2020/002000.
Apr. 7, 2020 Written Opinion issued in International Patent Application No. PCT/JP2020/002000.

* cited by examiner

THREAD FORMING TAP

TECHNICAL FIELD

The present invention relates to a thread forming tap, and, more particularly, to a technique for reducing a thrust force required to force the thread forming tap in a tapping operation in which an internal thread is machined by the thread forming tap.

BACKGROUND ART

There is known a thread forming tap including a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, wherein the thread forming tap is to be screwed into a prepared hole provided in a workpiece, so as to cause an inner circumferential surface of the prepared hole to be plastically deformed for thereby forming an internal thread corresponding to the external thread provided in the complete thread portion. A thread forming tap described in Patent Document 1 is an example of such a thread forming tap.

PRIOR ART DOCUMENT

Patent Documents

Patent Document 1:
Japanese Unexamined Patent Application Publication No. 2004-314231

DISCLOSURE OF THE INVENTION

Object to be Achieved by the Invention

By the way, when a tapping (rolling) operation is performed, a tapping machine applies, to the thread forming tap, a rotation torque and a thrust force acting in a forward direction, such that a screw thread of the external thread in the leading portion is caused to bite into the inner circumferential surface of the prepared hole so as to cause the inner circumferential surface to be plastically deformed and to cause the leading portion of the thread forming tap to be screwed into the prepared hole.

The screw thread of the external thread has a leading flank and a trailing flank, which are to be positioned on a front side of the trailing flank and on a rear side of the leading flank, respectively. Each of the leading flank and the trailing flank receives, from the workpiece, a reaction force acting against a force by which the plastic deform is caused. Further, the leasing flank receives, from the workpiece, a reaction force acting against the thrust force. Therefore, in the tapping operation, a large pressure is applied to the leading flank, whereby the leading flank is worn earlier than the trailing flank, so that there is a case in which the thread forming tap does not provide sufficient durability and tool life.

The present invention was made in view of the background discussed above. It is therefore an object of the present invention to suppress reduction of the durability and reduction of the tool life, by suppressing the pressure applied to the leading flank in the tapping operation.

Measures for Solving the Problem

The gist of the present invention is that, in a thread forming tap comprising (a) a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, wherein the thread forming tap is to be screwed into a prepared hole provided in a workpiece, so as to cause an inner circumferential surface of the prepared hole to be plastically deformed for thereby forming an internal thread corresponding to the external thread provided in the complete thread portion, (b) a screw thread of the external thread has a leading flank and a trailing flank, which are to be positioned on a front side of the trailing flank and on a rear side of the leading flank, respectively, when the thread forming tap is screwed into the prepared hole, and (c) the screw thread is shaped such that, in the leading portion, an indentation depth into the workpiece made by the leading flank is smaller than an indentation depth into the workpiece made by the trailing flank.

Effect of the Invention

In the thread forming tap according to the present invention, the screw thread of the external thread has the leading flank positioned on the front side and the trailing flank positioned on the rear side of the leading flank when the thread forming tap is screwed into the prepared hole, and the screw thread is shaped such that, in the leading portion, the indentation depth into the workpiece made by the leading flank is smaller than the indentation depth into the workpiece made by the trailing flank. Owing to this construction, during a rolling operation, i.e., a tapping operation, a pressure, which is applied to the leading flank, for plastically deforming the workpiece, is made smaller than that applied to the trailing flank. Thus, the pressure applied to the leading flank is suppressed so that the reduction of the durability and reduction of the tool life are suppressed.

It is preferable that the screw thread of the external thread has a symmetrical isosceles triangular shape in a cross section thereof, and a pitch of the screw thread in at least a part of the leading portion is larger than a pitch of the screw thread in the complete thread portion by a range in which the indentation depth into the workpiece made by the leading flank is not zeroed. Owing to this construction, during the tapping operation, the pressure, which is applied to the leading flank, for plastically deforming the workpiece, is made smaller than that applied to the trailing flank. Thus, the pressure applied to the leading flank is suppressed so that the reduction of the durability and reduction of the tool life are suppressed.

It is preferable that the pitch of the screw thread in the leading portion is a constant value that is not larger than a leading-portion maximum pitch Pgmax defined by expression (1) given below, $$Pgmax = Po/(1 - \tan\alpha \times \tan\theta) \quad (1)$$

where "Po" represents a pitch of the screw thread in the complete thread portion, "α" represents an angle of slope connecting crests of the screw thread in the leading portion, and "θ" represents a flank angle. Owing to this construction, during the tapping operation, the pressure, which is applied to the leading flank, for plastically deforming the workpiece, is made smaller than that applied to the trailing flank. Thus, the pressure applied to the leading flank is suppressed so that the reduction of the durability and reduction of the tool life are suppressed.

It is preferable that the pitch of the screw thread in a part of the leading portion is larger than the pitch of the screw thread in the complete thread portion. Owing to this construction, during the tapping operation, the pressure, which is applied to the leading flank, for plastically deforming the workpiece, is made smaller than that applied to the trailing flank. Thus, the pressure applied to the leading flank is suppressed so that the reduction of the durability and reduction of the tool life are suppressed.

It is preferable that the pitch of the screw thread in the leading portion is increased in a direction toward a distal end of the leading portion. Owing to this construction, during the tapping operation, the pressure, which is applied to the leading flank, for plastically deforming the workpiece, is made smaller than that applied to the trailing flank. Thus, the pressure applied to the leading flank is suppressed so that the reduction of the durability and reduction of the tool life are suppressed.

MODES FOR CARRYING OUT THE INVENTION

Hereinafter, preferred embodiments of the invention will be described in detail with reference to the accompanying drawings. It is noted that, in the embodiments described below, the figures of the drawings are simplified or deformed, as needed, for convenience of description, and each portion is not necessarily precisely depicted in terms of dimension ratio, shape, etc.

First Embodiment

Figure 1:
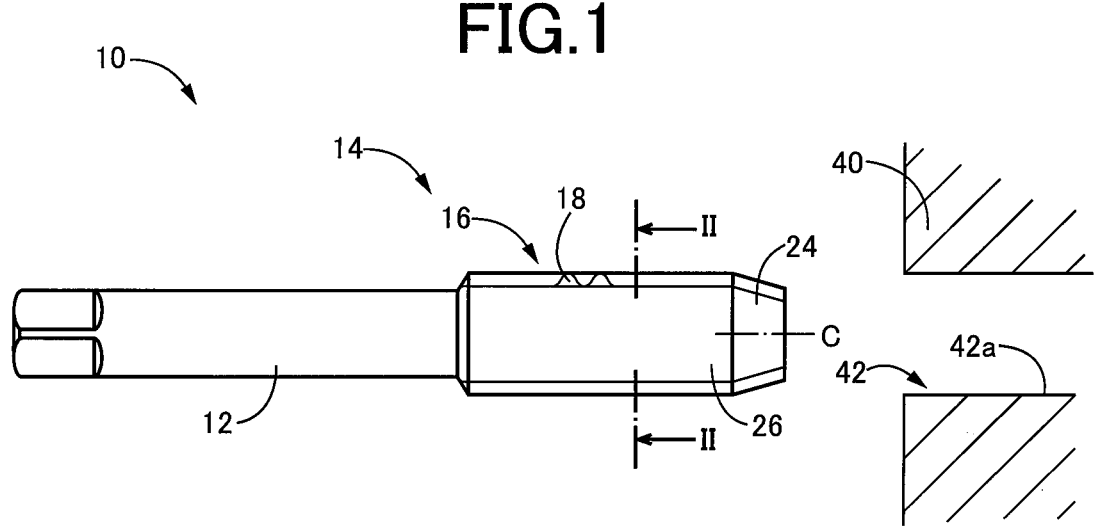
FIG. 1 is a view explaining a thread forming tap as an embodiment of the present invention, and is a front view as seen in a direction perpendicular to an axis of the tap.
Figure 2:
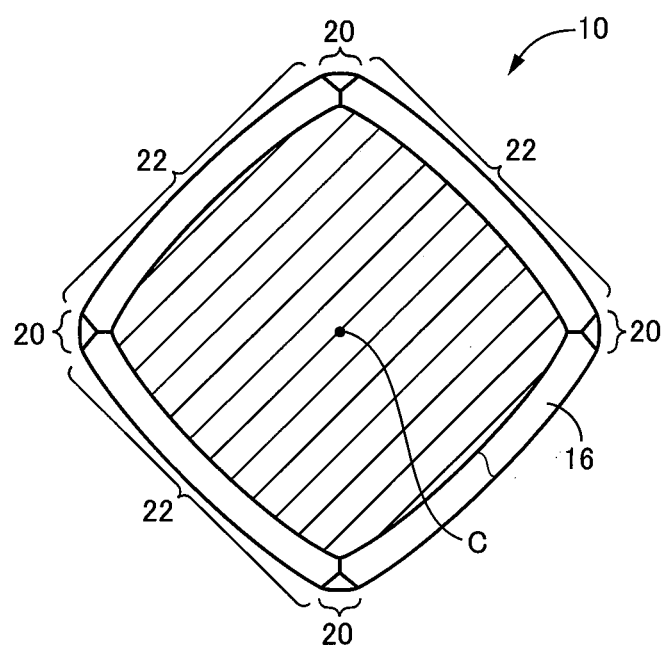
FIG. 2 is a cross sectional view taken along arrows II-II in FIG. 1

FIG. 1 is a view showing a thread forming tap 10 as an embodiment of the present invention, and is a front view as seen in a direction perpendicular to an axis C about which the thread forming tap 10 is to be rotated. The thread forming tap 10 includes a shank portion 12 that is to be attached to a spindle of a tapping machine (not shown) through a holder (not shown), and a thread portion 16 that is provided to form (roll) an internal thread 44 (see FIG. 4), such that the shank portion 12 and the thread portion 16 are coaxially integral with each other. FIG. 2 is a view of a cross section that is cut along a screw thread 18 of the thread portion 16 in a part indicated by arrows II-II in FIG. 1, wherein the cross section is substantially perpendicular to the axis C. The thread portion 16 has a polygonal shape defined by sides each of which is outwardly curved. In the present embodiment, the thread portion 16 has a substantially square shape in its cross section, and has an outer circumferential surface provided with an external thread 14 that is to be caused to bite into an inner circumferential surface (surface layer portion) 42a of a prepared hole 42 of a workpiece (internal thread material) 40 so as to cause the inner circumferential surface 42a to be plastically deformed for thereby forming the internal thread 44. The thread forming tap 10 according to the present embodiment is to be used to machine a single thread, and accordingly the external thread 14 is also a single thread.

The screw thread 18 constituting the external thread 14 has a cross sectional shape corresponding to a shape of a valley of the internal thread 44 that is to be formed, and extends along a helix having a lead angle of the internal thread. The cross sectional shape of the screw thread 18 is a symmetrical isosceles triangular shape, namely, a symmetrical triangular thread profile providing right and left flank angles that are equal to each other. The thread portion 16 includes a plurality of protruding portions 20 (four protruding portions 20 in the present embodiment) and a plurality of relieved portions 22 that are alternately arranged in a helical direction in which the screw thread 18 extends. The protruding portions 20, in each of which the screw thread 18 protrudes radially outwardly, are arranged equiangularly about the axis C at an angular pitch of 90°. The relieved portions 22, each of which has a small diameter and is contiguous to a corresponding one of the protruding portions 20 in the helical direction, are arranged equiangularly about the axis C at an angular pitch of 90°. That is, the multiplicity of protruding portions 20 are arranged in four lines that correspond to respective vertexes of a regular square shape, such that the protruding portions 20 of each of the four lines are successively arranged in parallel to the axis C, and such that the four lines of protruding portions 20 are arranged equiangularly about the axis C.

The thread portion 16 includes a complete thread portion 26 and a leading portion 24 which is provided to be contiguous with the complete thread portion 26. In the complete thread portion 26 having a diameter constant in a direction of the axis C, a pitch Po, which is a distance between crests of the screw thread 18, is constant in the direction of the axis C. In the leading portion 24 having a diameter reduced in a direction toward a distal end of the thread forming tap 10, a pitch Pg of the screw thread 18 is larger than the pitch Po of the screw thread 18 in the complete thread portion 26. In the leading portion 24, the screw thread 18 having the symmetrical triangular thread profile in its cross section has an outside diameter, an effective diameter and a root diameter each of which is reduced at a constant rate of change in the direction toward the distal end of the thread forming tap 10. The protruding portions 20 and the relieved portions 22 are alternately arranged in a circumferential direction in the leading portion 24 as in the complete thread portion 26, so that the leading portion 24 has substantially a regular square cross-sectional shape as the complete thread portion 26 that is shown in FIG. 2.

Figure 3:
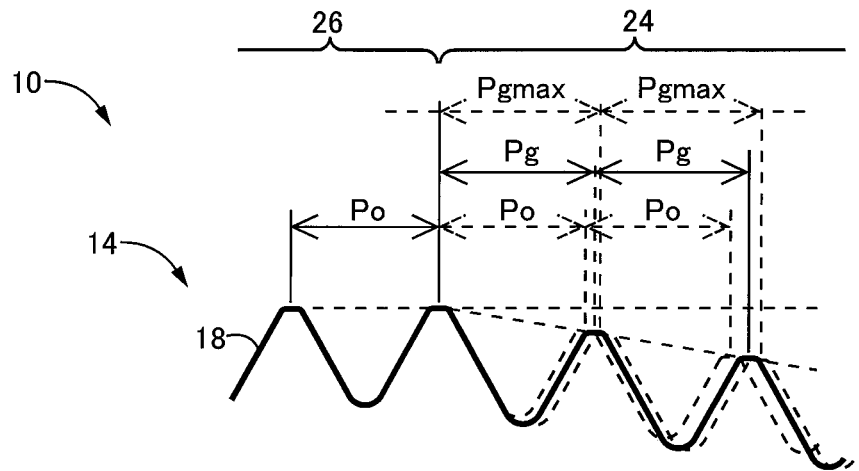
FIG. 3 is a view showing a major portion of a cross section containing an axis of the thread forming tap of FIG. 1, and explaining a pitch Po of a screw thread in a complete thread portion, a pitch Pg of the screw thread in a leading portion that is contiguous to the complete thread portion in a direction of the axis, and a leading-portion maximum pitch Pgmax of the screw thread in the leading portion.

FIG. 3 is a view showing a major portion of a cross section containing an axis of the thread forming tap 10 of FIG. 1 and passing through the protruding portions 20, and indicating the pitch Po of the screw thread 18 in the complete thread portion 26, the pitch Pg of the screw thread 18 in the leading portion 24 that is contiguous to the complete thread portion 26 in the direction of the axis C, and a leading-portion maximum pitch Pgmax of the screw thread 18 in the leading portion 24. The pitch Pg of the screw thread 18 in the leading portion 24 is a constant value, and is larger than the pitch Po of the screw thread 18 in the complete thread portion 26. The pitch Pg of the screw thread 18 in the leading portion 24 is set to a value not larger than the leading-portion maximum pitch Pgmax that is defined by expression (1) given below.

$$Pgmax = Po/(1 - \tan\alpha \times \tan\theta) \quad (1)$$

where "α" represents a slope (degree) of the leading portion 24, and "θ" represents a flank angle (half angle of the screw thread).

Figure 4:
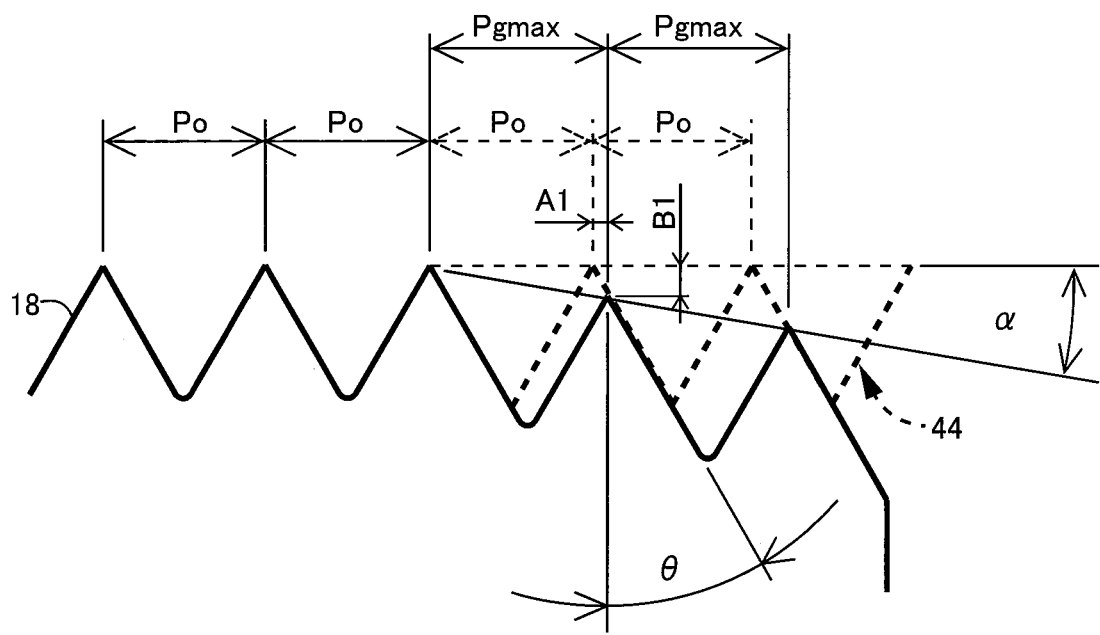
FIG. 4 is a view explaining a basis for calculation of the leading-portion maximum pitch Pgmax of the thread forming tap of FIG. 1.

That is, the pitch Pg of the screw thread 18 in the leading portion 24 is set to satisfy Po<Pg≤Pgmax. In FIG. 4, broken line represents a screw thread of the internal thread 44 having the pitch Po, while solid line represents the screw thread having the pitch Pgmax. The leading-portion maximum pitch Pgmax is a value within a range in which an amount of indentation made by the leading flank 18a is not zeroed, namely, a value within a range in which the internal thread 44 formed in the workpiece 40 is not exceeded.

In FIG. 4, a distance A1 and a distance B1 have a relationship represented by B1=A1/tan θ, and the distance B1 is represented by B1=Pg×tan α, so that a relationship represented by expression (2) is derived. The expression (1) given above is derived by substituting A1=Pg−Po into the expression (2).

$$A1 = Pg \times \tan\alpha \times \tan\theta \quad (2)$$

Figure 5:
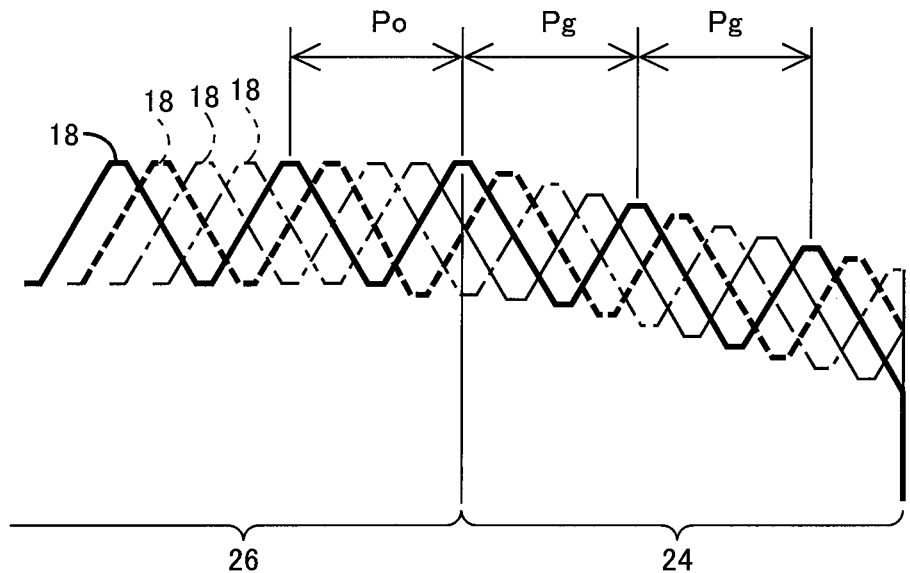
FIG. 5 is a view showing, in an overlapping manner, cross sections of the screw thread of the thread forming tap of FIG. 1, in a case in which the pitch Pg of the screw thread in the leading portion satisfies a relationship represented by Po<Pg<Pgmax, wherein the cross sections are taken in respective planes which contain the axis and which are angularly spaced by 90° about the axis.
Figure 6:
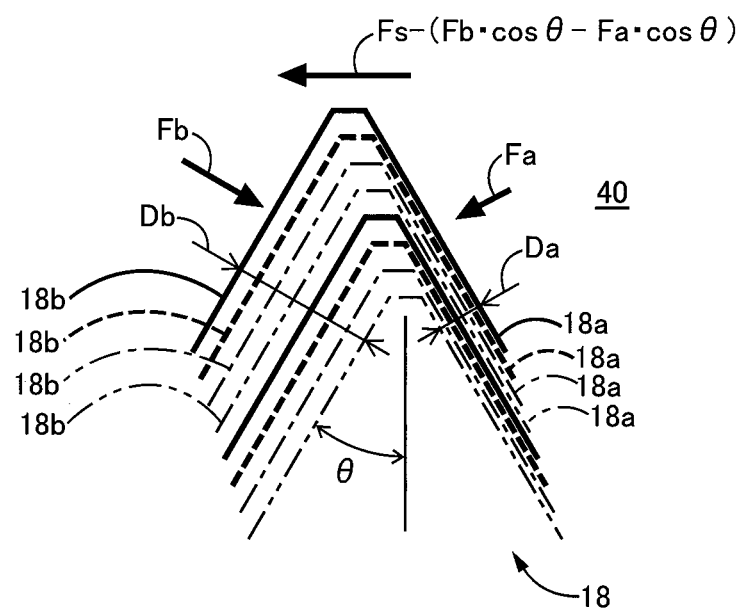
FIG. 6 is a view explaining an action of the thread forming tap of FIG. 5 for expanding a prepared hole by causing the screw thread in the leading portion to bite into an inner circumferential surface of the prepared hole.

FIG. 5 is a view showing, in an overlapping manner, cross sections of the screw thread 18 of the thread forming tap 10 of FIG. 1, wherein the cross sections are taken in respective planes which contain the axis C and which are angularly spaced by 90° about the axis C. FIG. 6 is a view explaining an action of the thread forming tap 10 for expanding the prepared hole 42 of the workpiece 40 by causing the screw thread 18 in the leading portion 24 to bite into the inner circumferential surface 42a of the prepared hole 42 upon rotation of the thread forming tap 10 when the leading portion 24 of the thread forming tap 10 is screwed into the prepared hole 42. In FIGS. 5 and 6, thick solid line represents the screw thread in a first cross section, thick broken line represents the screw thread in a second cross section when the tap 10 has been rotated clockwise about the axis C by 90° (in forward direction) from the first cross section, one-dot chain line represents the screw thread in a third cross section when the tap 10 has been further rotated clockwise about the axis C by 90° (in forward direction) from the second cross section, and tow-dot chain line represents the screw thread in a fourth cross section when the tap 10 has been further rotated clockwise about the axis C by 90° (in forward direction) from the third cross section.

When the thread forming tap 10 is screwed into the prepared hole 42 of the workpiece 40 with the rotation torque (N·cm) and the thrust force (N) (acting in the forward direction) being applied from the tapping machine (not shown) to the thread forming tap 10, the leading flank 18a, which is located on a front side of the trailing flank 18b, has a smaller amount of bite into the workpiece 40, i.e., a smaller indentation depth during rotation of the thread forming tap 10 by a certain rotation angle such as 360°, than the trailing flank 18b located on a rear side of the leading flank 18a, because the pitch Pg of the screw thread 18 in the leading portion 24 is set to be larger than the pitch Po of the screw thread 18 in the complete thread portion 26. That is, an indentation depth Da, which is an amount of bite into the workpiece 40 in a direction perpendicular to the leading flank 18a, is smaller than an indentation depth Db, which is an amount of bite into the workpiece 40 in a direction perpendicular to the trailing flank 18b, during rotation of the thread forming tap 10 by the certain rotation angle such as 360°, so that the an amount of plastic deformation of the workpiece 40, which is made by the leading flank 18a, is smaller than an amount of plastic deformation of the workpiece 40, which is made by the trailing flank 18b, during rotation of the thread forming tap 10 by the certain rotation angle. Therefore, a reaction force Fa applied to the leading flank 18a from the workpiece 40 is smaller than a reaction force Fb applied to the trailing flank 18b from the workpiece 40.

Consequently, a thrust reaction force Fs, which acts against the thrust force (pushing force) of the forward direction applied by the tapping machine (not shown), is reduced by a value represented by Fb·cos θ−Fa·cos θ that corresponds to a difference between Fb·cos θ that is a component of the reaction force Fb (applied to the trailing flank 18b from the workpiece 40) in the direction of the axis C and Fa·cos θ that is a component of the reaction force Fa (applied to the leading flank 18a from the workpiece 40) in the direction of the axis C. That is, the thrust reaction force Fs is reduced to a reduced value represented by Fs−(Fb·cos θ−Fa·cosθ). Thus, a pressure applied to the leading flank 18a is reduced whereby wear of the leading flank 18a is reduced so that reductions of durability and tool life of the thread forming tap 10 are suppressed.

Figure 7:
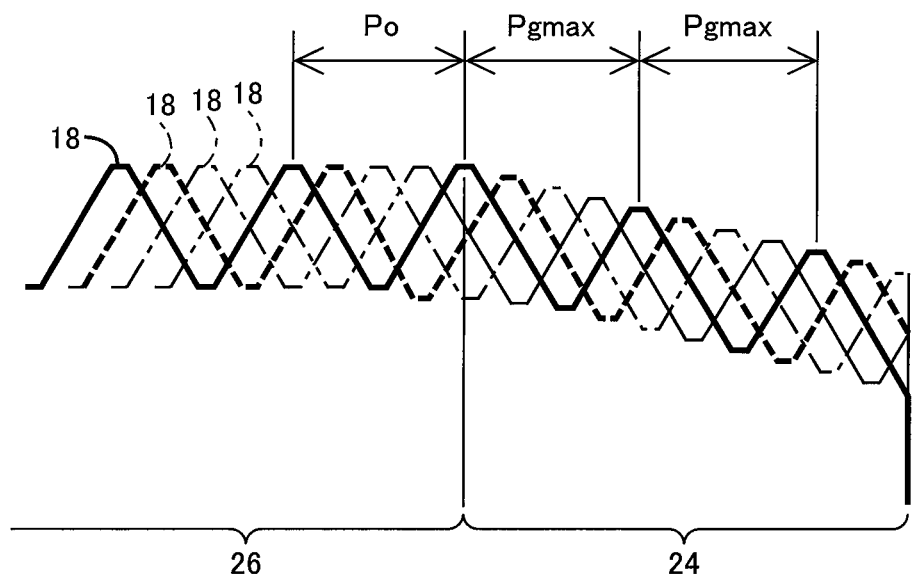
FIG. 7 is a view corresponding to the view of FIG. 5, and showing, in an overlapping manner, cross sections of the thread forming tap of FIG. 1, in a case in which the pitch Pg of the screw thread in the leading portion satisfies a relationship represented by Po=Pgmax, wherein the cross sections are taken in respective planes which contain the axis and which are angularly spaced by 90° about the axis.
Figure 8:
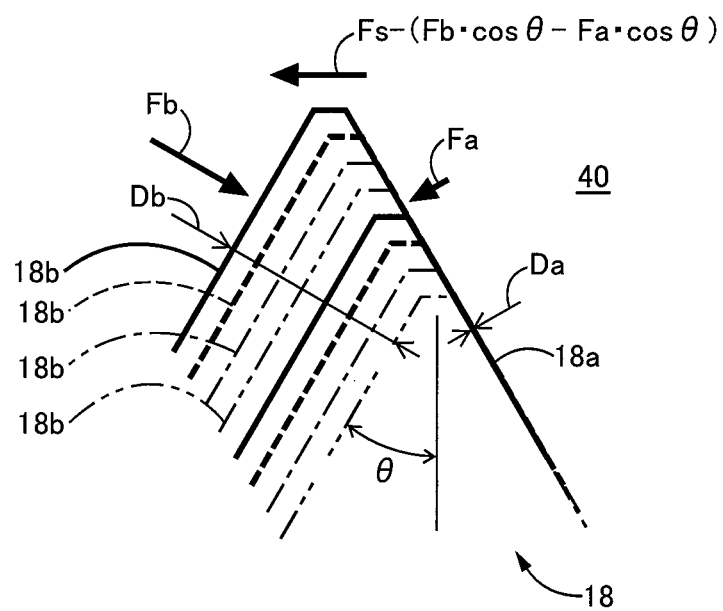
FIG. 8 is a view corresponding to the view of FIG. 6, and explaining an action of the thread forming tap of FIG. 7 for expanding a prepared hole by causing the screw thread in the leading portion to bite into an inner circumferential surface of the prepared hole.

FIG. 7 is a view showing, in an overlapping manner, cross sections of the thread forming tap of FIG. 1, in a case in which the pitch Pg of the screw thread 18 in the leading portion 24 is the leading-portion maximum pitch Pgmax, wherein the cross sections are taken in respective planes which contain the axis C and which are angularly spaced by 90° about the axis C. FIG. 8 is a view explaining an action of the thread forming tap 10 for expanding the prepared hole 42 by causing the screw thread 18 in the leading portion 24 to bite into the inner circumferential surface 42a of the prepared hole 42 upon rotation of the thread forming tap 10 when the leading portion 24 of the thread forming tap 10 is screwed into the prepared hole 42. In this case, an amount of plastic deformation of the workpiece 40 made by the leading flank 18a is almost zero, whereby the reaction force Fa applied to the leading flank 18a from the workpiece 40 is smaller than in the case of FIG. 6, so that the wear of the leading flank 18a is further reduced and the reductions of the durability and the tool life of the thread forming tap 10 is suppressed.

Figure 15:
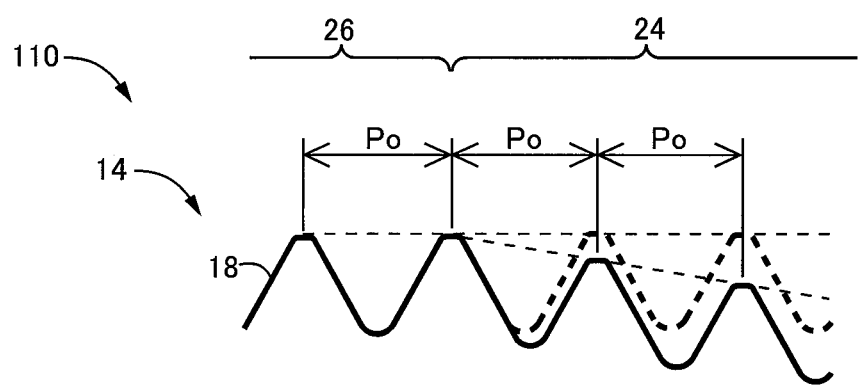
FIG. 15 is a cross sectional view showing a major portion of a thread forming tap as a comparative example having a standard shape.
Figure 16:
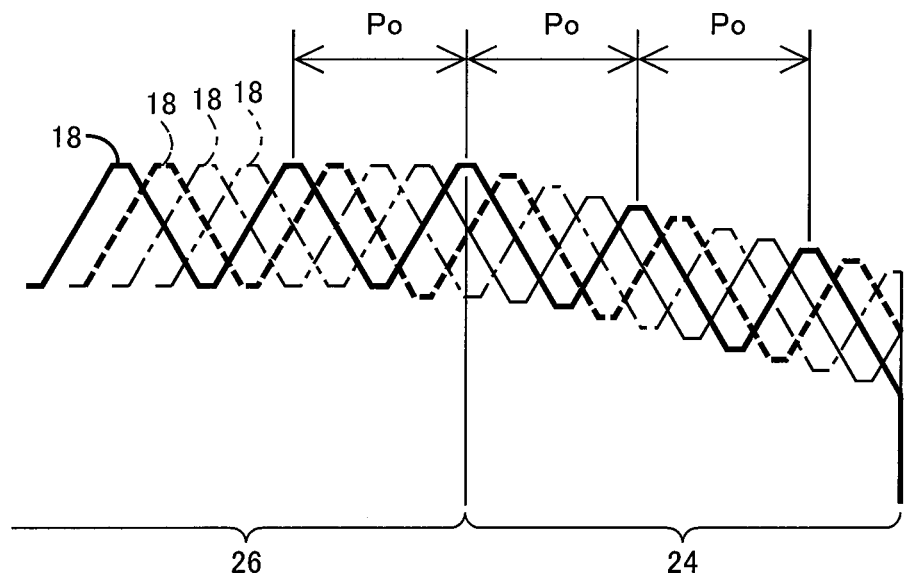
FIG. 16 is a view corresponding to the view of FIG. 5, and showing, in an overlapping manner, cross sections of the screw thread of the thread forming tap of FIG. 15, wherein the cross sections are taken in respective planes which contain the axis C and which are angularly spaced by 90° about the axis C.
Figure 17:
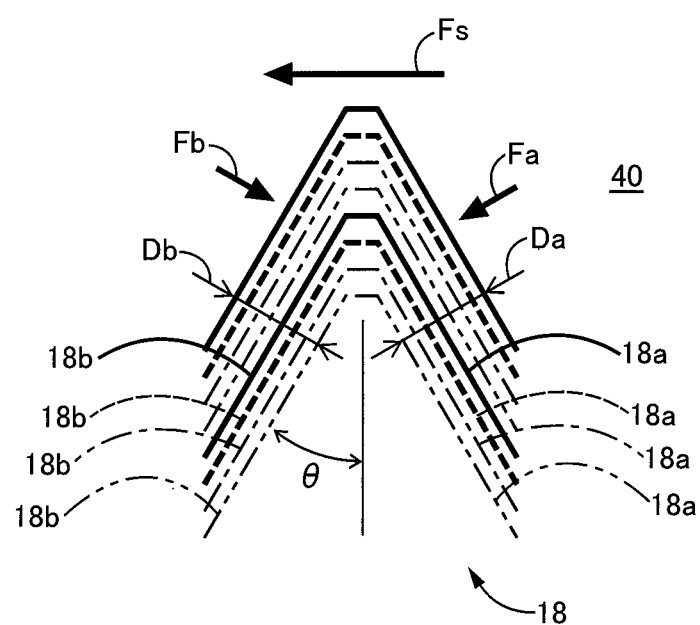
FIG. 17 is a view corresponding to the view of FIG. 6, and explaining an action of the thread forming tap of FIG. 15 for expanding a prepared hole by causing the screw thread in the leading portion to bite into an inner circumferential surface of the prepared hole.

FIG. 15 is a cross sectional view showing a major portion of a thread forming tap 110 as a comparative example having a standard shape so that the pitch of the screw thread 18 in the complete thread portion 26 and the pitch of the screw thread 18 in the leading portion 24 are equal to each other. FIG. 16 is a view showing, in an overlapping manner, cross sections of the screw thread 18 of the thread forming tap 110 as the comparative example of FIG. 15, wherein the cross sections are taken in respective planes which contain the axis C and which are angularly spaced by 90° about the axis C. FIG. 17 is a view explaining an action of the thread forming tap 110 as the comparative example of FIG. 15 for expanding the prepared hole 42 by causing the screw thread 18 in the leading portion 24 to bite into the inner circumferential surface 42a of the prepared hole 42.

As shown in FIG. 17, the indentation depth Da, which is the amount of bite into the workpiece 40 by the leading flank 18a, is substantially equal to the indentation depth Db, which is the amount of bite into the workpiece 40 by the trailing flank 18b, so that the amount of plastic deformation of the workpiece 40, which is made by the leading flank 18a, is substantially equal to the amount of plastic deformation of the workpiece 40, which is made by the trailing flank 18b. Therefore, the reaction force Fa applied to the leading flank 18a from the workpiece 40 is substantially equal to the reaction force Fb applied to the trailing flank 18b from the workpiece 40.

Consequently, the difference between Fbcosθ that is the component of the reaction force Fb (applied to the trailing flank 18b from the workpiece 40) in the direction of the axis C and Fa·cos θ that is the component of the reaction force Fa (applied to the leading flank 18a from the workpiece 40) in the direction of the axis C, is substantially zero. Thus, it is not possible to obtain an effect of reducing the thrust reaction force Fs that acts against the thrust force of the forward direction applied by the tapping machine (not shown). That is, the thrust reaction force Fs and the reaction force Fa from the workpiece 40 are applied to the leading flank 18a whereby the wear of the leading flank 18a is increased, so that the reductions of the durability and the tool life of the thread forming tap of the comparative example cannot be avoided.

(Rolling Tests)

The present inventor prepared a comparative example in which the pitch Pg of the screw thread 18 in the leading portion 24 is equal to the pitch Po of the screw thread 18 in the complete thread portion 26 (Pg=Po), an example 1-a in which the pitch Pg of the screw thread 18 in the leading portion 24 is 1.025 times as large as the pitch Po of the screw thread 18 in the complete thread portion 26 (Pg=1.025Po), an example 1-b in which the pitch Pg of the screw thread 18 in the leading portion 24 is 1.050 times as large as the pitch Po of the screw thread 18 in the complete thread portion 26 (Pg=1.050Po), and an example 1-c in which the pitch Pg of the screw thread 18 in the leading portion 24 is equal to the leading-portion maximum pitch Pgmax that is larger than the pitch Po of the screw thread 18 in the complete thread portion 26 (Pg=Pgmax). Then, the inventor measured the force F (N) applied from each thread forming tap and the torque T (N·cm) required to drive and rotate the thread forming tap when a rolling operation is performed under a rolling condition describe below. Each of the examples 1-a, 1-b, 1-c and comparative example is a thread forming tap for metric thread M6×1.0 in which a chamfer length (i.e., length of the leading portion 24) is 2.5 pitches. Each of the examples 1-a, 1-b, 1-c and comparative example is the same as the thread forming tap 10 shown in FIGS. 1-3 except in the pitch Pg of the screw thread 18 in the leading portion 24.

(Rolling Condition)
Work Material: steel (SCM440)
Rolling Speed: 10 m/min
Feed: synchronous feed with fixed type holder Each of FIGS. 9, 10, 11 and 18 shows measured values of the thrust force F (N) (pushing force) and the torque T (N·cm) applied to a corresponding one of the examples 1-a, 1-b, 1-c and comparative example, during a rolling operation using the corresponding one of the examples 1-a, 1-b, 1-c and comparative example, under the above-described rolling condition, in a two-dimensional coordinates with a time being represented on its horizontal axis. Each of FIGS. 12 and 19 is a view showing the thrust force F (N) during the rolling operation using a corresponding one of the example 1-c and comparative example, under the same condition as the above-described rolling condition, in a two-dimensional coordinates with a time being represented on its horizontal axis and with the thrust force F being represented on its vertical axis, wherein the thrust force F is calculated through CAE (Computer Aided Engineering) analysis.

Figure 9:
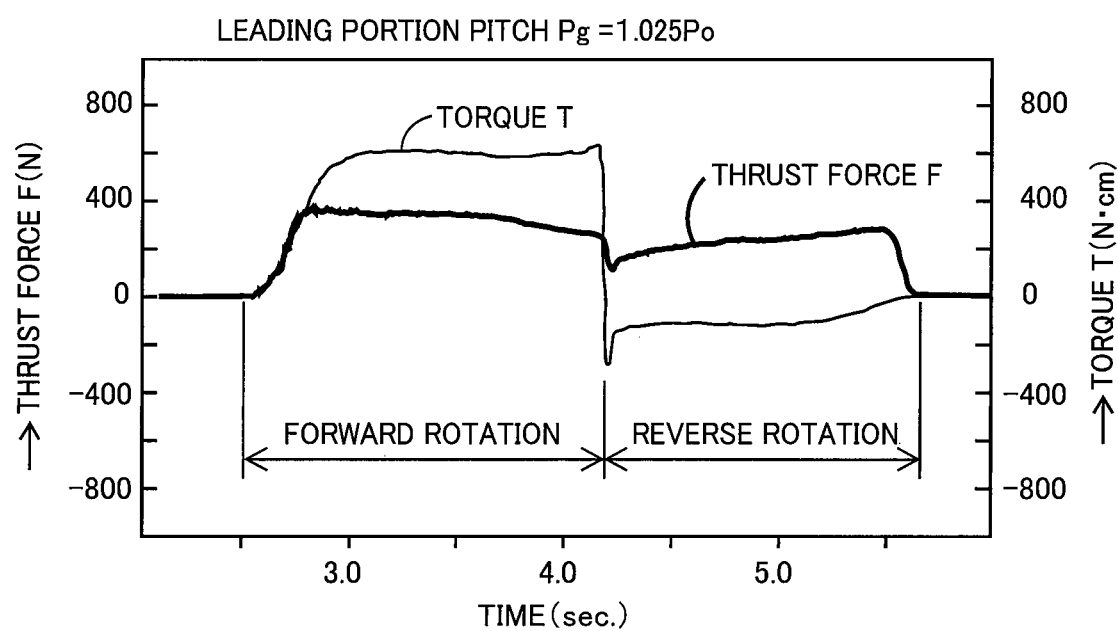
FIG. 9 is a view showing measured values of a thrust force F and a torque T applied to an example 1-a during a rolling operation using the example 1-a, in a two-dimensional coordinates with a time being represented on its horizontal axis.
Figure 10:
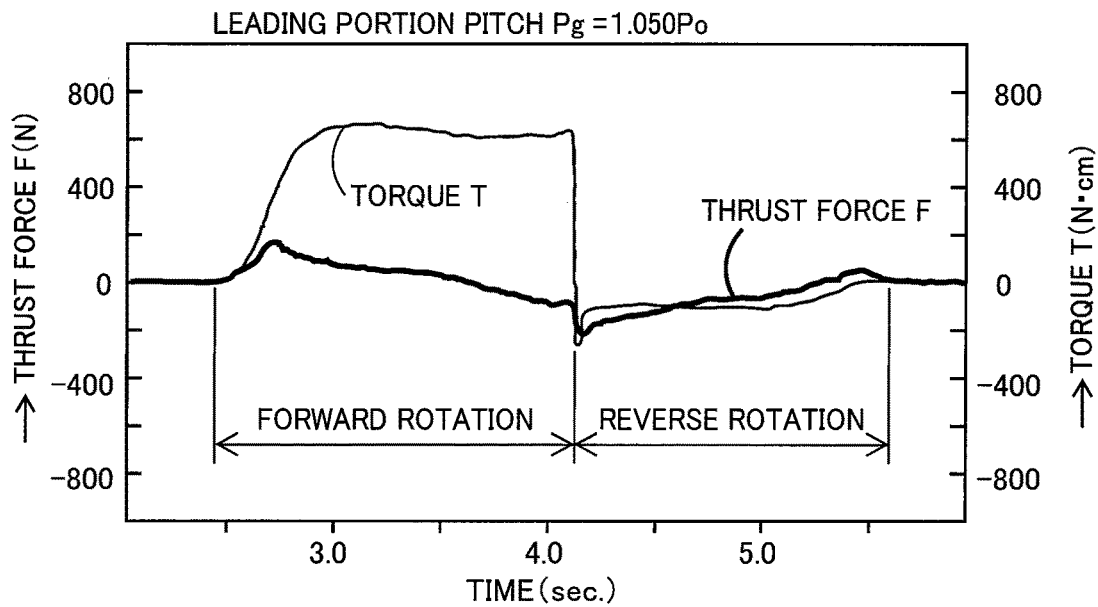
FIG. 10 is a view showing measured values of the thrust force F and the torque T applied to an example 1-b during a rolling operation using the example 1-b, in a two-dimensional coordinates with a time being represented on its horizontal axis.
Figure 11:
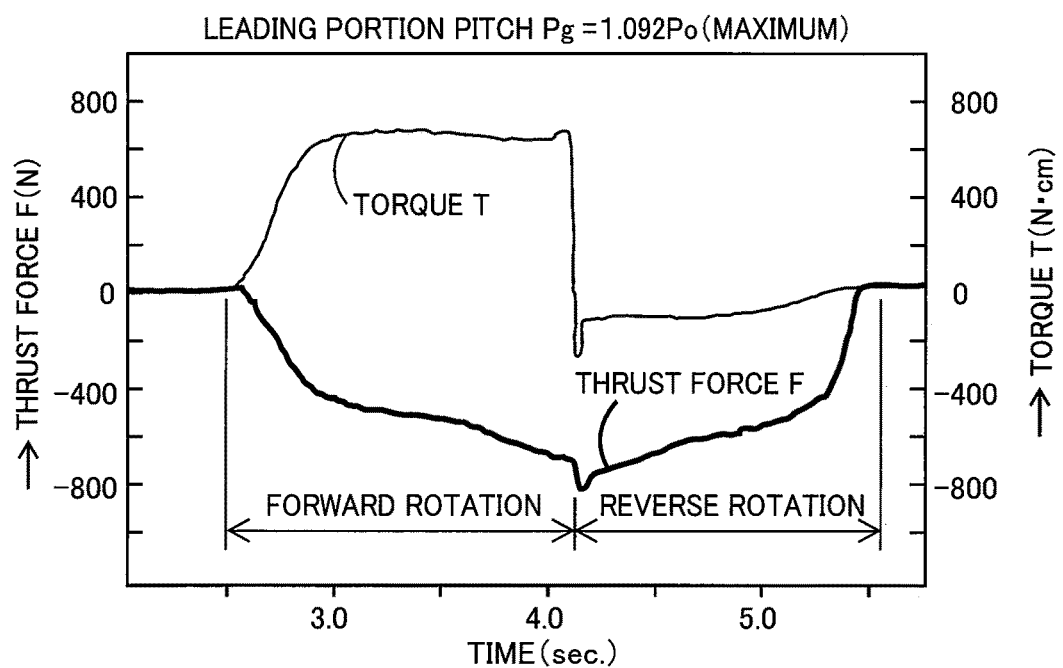
FIG. 11 is a view showing measured values of the thrust force F and the torque T applied to an example 1-c during a rolling operation using the example 1-c, in a two-dimensional coordinates with a time being represented on its horizontal axis.
Figure 12:
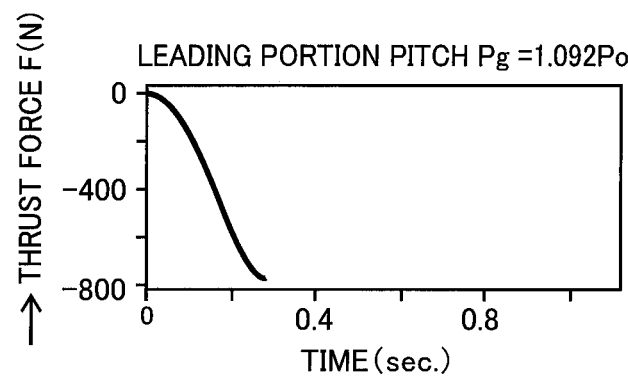
FIG. 12 is a view showing the thrust force F during the rolling operation using the thread forming tap of FIG. 11, in a two-dimensional coordinates with a time being represented on its horizontal axis and with the thrust force F being represented on its vertical axis, wherein the thrust force F is calculated through CAE (Computer Aided Engineering) analysis.
Figure 18:
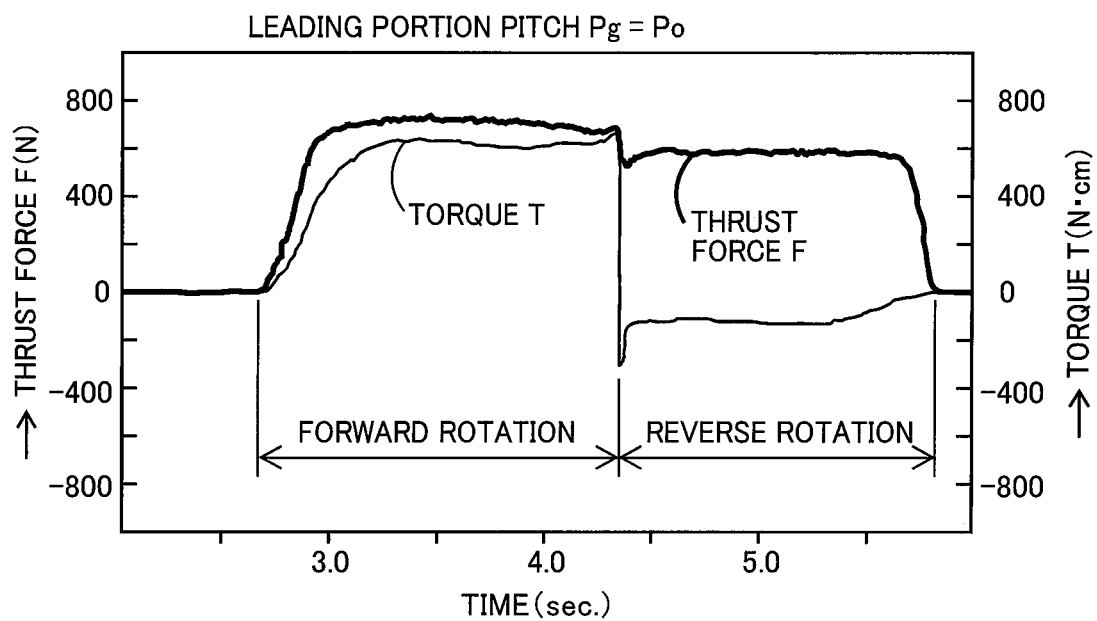
FIG. 18 is a view corresponding to the view of FIG. 9, and showing measured values of a thrust force F and a torque T applied to the thread forming tap of FIG. 15 during a rolling operation using the thread forming tap of FIG. 15, in a two-dimensional coordinates with a time being represented on its horizontal axis.
Figure 19:
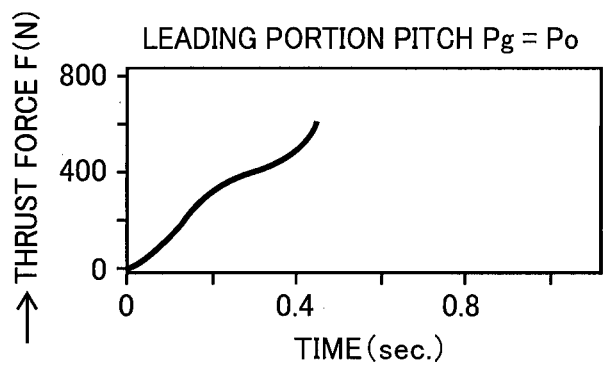
FIG. 19 is a view corresponding to the view of FIG. 12, and showing the thrust force F during the rolling operation using the thread forming tap of FIG. 15, in a two-dimensional coordinates with a time being represented on its horizontal axis and with the thrust force F being represented on its vertical axis, wherein the thrust force F is calculated through CAE (Computer Aided Engineering) analysis.

As in the results of the measurements made in the above-described tests shown in FIGS. 11 and 18, in the results of behaviors of each thread forming tap upon biting into the workpiece, which were checked through the CAE analysis, as shown in FIGS. 12 and 19, the reduction of the thrust force was confirmed in the example of the present embodiment, as compared with the comparative example. Further, as shown in FIGS. 9, 10 and 11, the torque T applied to each of the examples 1-a, 1-b, 1-c during its forward movement (with forward rotation) and its reverse movement (with reverse rotation) was almost the same as that applied to the comparative example shown in FIG. 18. However, as shown in FIGS. 9, 10 and 11, the thrust force F applied to each of the examples 1-a, 1-b, 1-c during its forward movement (with forward rotation) and its reverse movement (with reverse rotation) was remarkably smaller than that applied to the comparative example shown in FIG. 18. Among the examples 1-a, 1-b, 1-c, an amount of reduction of the thrust force F was larger as the pitch Pg of the screw thread 18 in the leading portion 24 was larger.

As described above, the thread forming tap 10 according to the present embodiment includes the complete thread portion 26 and the leading portion 24 which is provided to be contiguous with the complete thread portion 26 and which has the diameter reduced in the direction toward the distal end of the thread forming tap 10, such that the complete thread portion 26 and the leading portion 24 are provided with the external thread 14 in which the protruding portions and the relieved portions are alternately formed. The thread forming tap 10 is to be screwed into the prepared hole 42 provided in the workpiece 40, so as to cause the inner circumferential surface 42a of the prepared hole 42 to be plastically deformed for thereby forming the internal thread 44 corresponding to the external thread 14 provided in the complete thread portion 26. The screw thread 18 of the external thread 14 has the leading flank 18a and the trailing flank 18b, which are to be positioned on a front side of the trailing flank 18b and on a rear side of the leading flank 18a, respectively, when the thread forming tap 10 is screwed into the prepared hole 42. The screw thread 18 is shaped such that, in the leading portion 24, the indentation depth Da into the workpiece 40 made by the leading flank 18a is smaller than the indentation depth Db into the workpiece 40 made by the trailing flank 18b.

Owing to this construction, during the tapping operation, the reaction force Fa, which is applied to the leading flank 18a, for plastically deforming the workpiece 40, is made smaller than the reaction force Fb applied to the trailing flank 18b. Thus, the reaction force applied to the leading flank 18a is reduced and suppressed during the tapping operation so that the reduction of the durability and reduction of the tool life of the thread forming tap 10 are suppressed. Further, as a result of restraint of the thrust reaction force Fs acting against the thread forming tap 10, it is possible to suppress the thread forming tap 10 from being held down by the internal thread 44 formed in the prepared hole 42 when the thread forming tap 10 is moved away from the workpiece 40, and to accordingly to reduce generation of burrs.

In the thread forming tap 10 according to the present embodiment, the screw thread 18 of the external thread 14 has the symmetrical isosceles triangular shape in the cross section thereof, and the pitch Pg of the screw thread 18 in at least a part of the leading portion 24 is larger than the pitch Po of the screw thread 18 in the complete thread portion 26 by a range in which the indentation depth Da into the workpiece 40 made by the leading flank 18a is not zeroed. Owing to this construction, during the tapping operation, the reaction force Fa, which is applied to the leading flank 18a, for plastically deforming the workpiece 40, is made smaller than the reaction force Fb applied to the trailing flank 18b. Thus, the pressure applied to the leading flank 18a is suppressed during the tapping operation so that the reduction of the durability and reduction of the tool life of the thread forming tap 10 are suppressed.

In the thread forming tap 10 according to the present embodiment, the pitch Pg of the screw thread 18 in the leading portion 24 is a constant value that is not larger than the leading-portion maximum pitch Pgmax defined by the expression (1) given below, $$Pgmax = Po/(1 - \tan\alpha \times \tan\theta) \tag{1}$$

where "Po" represents the pitch of the screw thread 18 in the complete thread portion 26, "α" represents the angle of the slope connecting the crests of the screw thread 18 in the leading portion 24, and "θ" represents the flank angle (half angle of the screw thread). Owing to this construction, during the tapping operation, the reaction force, which is applied to the leading flank 18a, for plastically deforming the workpiece 40, is made smaller than that applied to the trailing flank 18b. Thus, the pressure applied to the leading flank 18a is suppressed so that the reduction of the durability and reduction of the tool life of the thread forming tap 10 are suppressed.

Second Embodiment

There will be described other embodiments of this invention. The same reference signs as used in the above-described embodiment will be used in the following embodiments, to identify the practically corresponding elements, and descriptions thereof are not provided.

Figure 13:
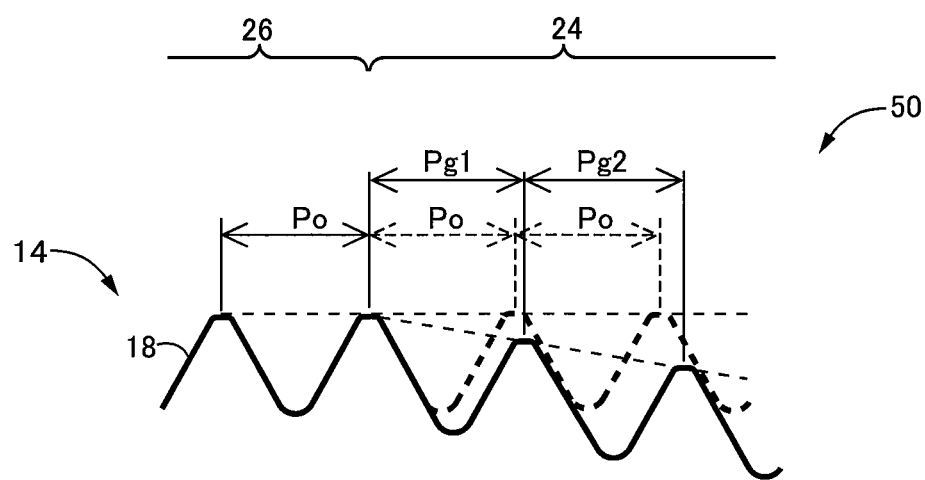
FIG. 13 is a view corresponding to the view of FIG. 3, and showing a screw thread of a thread forming tap as another embodiment of the present invention.

FIG. 13 is a view corresponding to the view of FIG. 3, and showing a major portion of a cross section of the screw thread 18 of a thread forming tap 50 as another embodiment of the present invention. In this thread forming tap 50, the pitch Pg of the screw thread 18 in the leading portion 24 is increased in a direction toward a distal end of the leading portion 24, such that the leading portion 24 includes sections contiguous to each other, wherein the pitch Pg is a pitch Pg1 that is larger than the pitch Po in one of the sections, and the pitch Pg is a pitch Pg2 that is larger than the pitch Pg1 in another one of the sections, as shown in FIG. 13.

In the thread forming tap 50 according to the present embodiment, the pitch of the screw thread 18 in the leading portion 24 is increased in a direction toward a distal end of the leading portion 24. Owing to this construction, during the tapping operation, the reaction force Fa, which is applied to the leading flank 18a from the workpiece 40, for plastically deforming the workpiece 40, is made smaller than the reaction force Fb applied to the trailing flank 18b from the workpiece 40. Thus, the pressure applied to the leading flank 18a is suppressed during the tapping operation, so that the reduction of the durability and reduction of the tool life of the thread forming tap 50 are suppressed.

Third Embodiment

Figure 14:
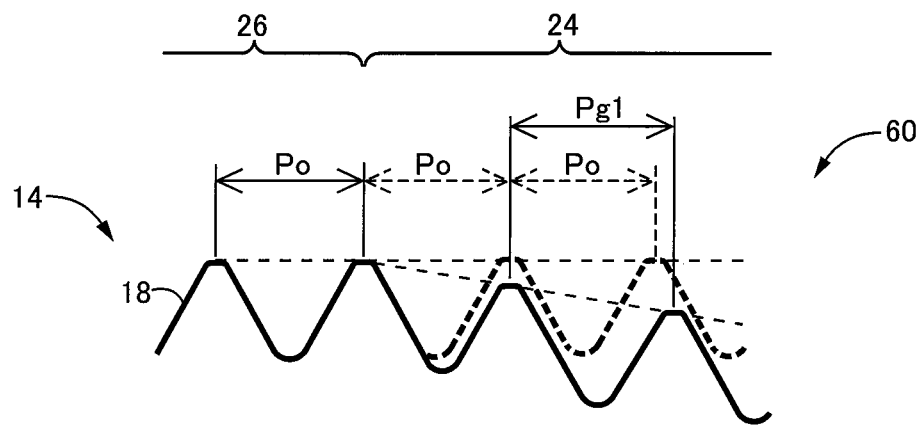
FIG. 14 is a view corresponding to the view of FIG. 3, and showing a screw thread of a thread forming tap as still another embodiment of the present invention.

FIG. 14 is a view corresponding to the view of FIG. 3, and showing the screw thread 18 of a thread forming tap 60 as still another embodiment of the present invention. In this thread forming tap 60, the pitch Pg of the screw thread 18 in the leading portion 24 is increased in a direction toward a distal end of the leading portion 24, such that the leading portion 24 includes sections contiguous to each other, wherein the pitch Pg is equal to the pitch Po (Pg=Po) in one of the sections, and the pitch Pg is the pitch Pg1 that is larger than the pitch Po in another one of the sections.

In the thread forming tap 60 according to the present embodiment, the pitch Pg of the screw thread 18 in a part of the leading portion 24 is larger than the pitch Po of the screw thread 18 in the complete thread portion 26. Owing to this construction, during the tapping operation, the reaction force Fa, which is applied to the leading flank 18a, for plastically deforming the workpiece 40, is made smaller than the reaction force Fb applied to the trailing flank 18b. Thus, the reaction force Fa applied to the leading flank 18a is suppressed during the tapping operation so that the reduction of the durability and reduction of the tool life of the thread forming tap 60 are suppressed.

While the embodiments of the present invention have been described in detail with reference to the drawings, it is to be understood that the invention may be embodied also in other forms.

Each of the thread forming taps 10, 50, 60 according to the above-described embodiments is to be used to be screwed into the prepared hole 42 provided in the workpiece 40, with the leading portion 24 being first introduced into the prepared hole 42, whereby the screw thread 18 provided in the external thread 14 is caused to bite into the inner circumferential surface 42a of the prepared hole 42, so as to cause the inner circumferential surface 42a to be plastically deformed for thereby forming the internal thread 44. For example, a drill or reamer may be provided integrally in a distal end portion of the thread forming tap, such that the prepared hole 42 is machined by the drill or reamer. Further, an inside-diameter finishing blade or blades may be provided integrally in the thread forming tap, such that an inside diameter of the internal thread 44 is finished by the inside-diameter finishing blade or blades. Moreover, the present invention is applicable not only to a thread forming tap for machining a single thread but also to a thread forming tap for machining a multiple thread such as a double or more thread.

In each of the thread forming taps 10, 50, 60 according to the above-described embodiments, it is preferable that the plurality of protruding portions 20 are provided to be arranged in three or more lines equiangularly about the axis C such that the protrusing portions 20 of each line are contiguous to each other in parallel to the axis C. However, the protruding portions 20 may be provided such that the protruding portions 20 of each line are contiguous to each other along a helix twisted about the axis C, or such that the protruding portions 20 are arranged non-equiangularly about the axis C. That is, the protruding portions 20 may be arranged in any one of various manners. Further, oil grooves or the like such as three of more oil grooves may be provided to extend in a direction of the axis C to divide the external thread 14 in a circumferential direction, as needed, such that a rolling fluid is supplied through the oil grooves.

In each of the thread forming taps 10, 50, 60 according to the above-described embodiments, it is common that the frank angle $\theta$ of the pair of flanks 18a, 18b of the screw thread 18 of the external thread 14 is 30° so that angles (all angles=2$\theta$) of the screw thread 18 are 60°. However, the present invention is applicable also to a thread forming tap in which the flank angle $\theta$ of the screw thread 18 is other than 30° or in which the frank angles $\theta$ of the pair of flanks 18a, 18b of the screw thread 18 are different from each other. Further, the crest of the screw thread 18 does not necessarily have to be flat but may be formed to be curved.

While the embodiments of the present invention have been described by reference to the accompanying drawings, it is to be understood that what have been described above are merely the embodiments of the present invention, and that the present invention may be embodied with various changes and modifications based on knowledges of those skilled in the art.

DESCRIPTION OF REFERENCE SIGNS

10; 50; 60: thread forming tap
14: external thread
16: thread portion
18: screw thread
18a: leading flank
18b: trailing flank
20: protruding portions
22: relieved portions
24: leading portion
26: complete thread portion
40: workpiece
42: prepared hole
44: internal thread
C: axis
Da: indentation depth
Db: indentation depth

The invention claimed is:

1. A thread forming tap comprising a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, wherein the thread forming tap is to be screwed into a prepared hole provided in a workpiece, so as to cause an inner circumferential surface of the prepared hole to be plastically deformed for thereby forming an internal thread corresponding to the external thread provided in the complete thread portion, wherein a screw thread of the external thread has a leading flank and a trailing flank, which are to be positioned on a front side of the trailing flank and on a rear side of the leading flank, respectively, when the thread forming tap is screwed into the prepared hole, wherein the screw thread is shaped such that, in the leading portion, an indentation depth into the workpiece made by the leading flank is smaller than an indentation depth into the workpiece made by the trailing flank, wherein the screw thread of the external thread has a symmetrical isosceles triangular shape in a cross section thereof, wherein a pitch of the screw thread in at least a part of the leading portion is larger than a pitch of the screw thread in the complete thread portion by a range in which the indentation depth into the workpiece made by the leading flank is not zeroed, and wherein the pitch of the screw thread in the leading portion is increased in a direction toward a distal end of the leading portion.

2. A thread forming tap comprising a complete thread portion and a leading portion which is provided to be contiguous with the complete thread portion and which has a diameter reduced in a direction toward a distal end of the thread forming tap, such that the complete thread portion and the leading portion are provided with an external thread in which protruding portions and relieved portions are alternately formed, wherein the thread forming tap is to be screwed into a prepared hole provided in a workpiece, so as to cause an inner circumferential surface of the prepared hole to be plastically deformed for thereby forming an internal thread corresponding to the external thread provided in the complete thread portion, wherein a screw thread of the external thread has a leading flank and a trailing flank, which are to be positioned on a front side of the trailing flank and on a rear side of the leading flank, respectively, when the thread forming tap is screwed into the prepared hole, wherein the screw thread is shaped such that, in the leading portion, an indentation depth into the workpiece made by the leading flank is smaller than an indentation depth into the workpiece made by the trailing flank, wherein the screw thread of the external thread has a symmetrical isosceles triangular shape in a cross section thereof, wherein a pitch of the screw thread in at least a part of the leading portion is larger than a pitch of the screw thread in the complete thread portion by a range in which the indentation depth into the workpiece made by the leading flank is not zeroed, and wherein the pitch of the screw thread in the part of the leading portion is larger than the pitch of the screw thread in the complete thread portion.

* * * * *